United States Patent [19]
Grosskrueger et al.

[11] Patent Number: 6,024,347
[45] Date of Patent: Feb. 15, 2000

[54] APPARATUS AND ASSOCIATED METHOD FOR DETUNING FROM RESONANCE A STRUCTURE

[75] Inventors: Duane D. Grosskrueger, Highlands Ranch; Bernie F. Carpenter, Littleton; Brian W. Easom, Lakewood; Jerry L. Draper, Littleton, all of Colo.

[73] Assignee: Lockhead Martin Corporation, Bethesda, Md.

[21] Appl. No.: 08/897,350

[22] Filed: Jul. 21, 1997

[51] Int. Cl.⁷ ..................................................... B22F 7/00
[52] U.S. Cl. ......................... 267/220; 267/136; 428/34.9
[58] Field of Search ................................ 267/140.14, 220, 267/136; 428/34.9, 35.1, 35.7, 36.3, 36.9, 913

[56] References Cited

U.S. PATENT DOCUMENTS

| | | | |
|---|---|---|---|
| 4,763,967 | 8/1988 | Schermer | 359/210 |
| 4,874,215 | 10/1989 | Montagu | 350/6.6 |
| 5,259,600 | 11/1993 | De Fontenal et al. | 267/220 |
| 5,297,791 | 3/1994 | Negishi | 273/80 R |
| 5,328,141 | 7/1994 | Dickinson | 248/550 |
| 5,398,916 | 3/1995 | Kramer et al. | 267/70 |
| 5,440,193 | 8/1995 | Barrett | 340/328 |
| 5,508,116 | 4/1996 | Barrett | 428/567 |
| 5,552,197 | 9/1996 | Bettinger | 428/34.9 |

OTHER PUBLICATIONS

Wayman, C.M., "Some Applications of Shape–Memory Alloys," Journal of Metals, Jun. 1980.

Primary Examiner—Matthew C. Graham
Attorney, Agent, or Firm—Holme Roberts & Owen LLP

[57] ABSTRACT

A system for detuning from resonance a support structure which receives vibratory energy is disclosed. In one embodiment, the system includes a substrate actuator having at least a first wire embedded in a substrate matrix material, the actuator being couplable to the support structure. The system may further include a heater for heating at least the first wire from a first to a second temperature to increase the modulus of elasticity of the first wire, which in turn increases the stiffness of the substrate actuator. Such an increase in the stiffness of the substrate actuator detunes from resonance structures supporting a device from which vibratory energy emanates, and also inhibits transmission of vibratory energy of specific frequencies into structures supporting equipment sensitive to vibrations.

31 Claims, 6 Drawing Sheets

APPARATUS AND ASSOCIATED METHOD FOR DETUNING FROM RESONANCE A STRUCTURE

FIELD OF THE INVENTION

The present invention generally relates to an apparatus for detuning from resonance a structure which is subject to vibrations, and more specifically, to a substrate actuator capable of increasing its stiffness to detune from resonance a structure subject to vibratory energy from a vibrating device, the substrate actuator being couplable to the structure.

BACKGROUND OF THE INVENTION

Over the years, various techniques and systems have been developed for damping vibrating devices, such as motors and compressors. Generally, such techniques and systems attempt to reduce the effect of vibrating devices on surrounding structures by isolating the vibrating device. For example, vibration isolation mounts having a rubber cylinder positioned between a support structure and a vibrating device mounted thereon have been used to isolate the vibratory motion of the vibrating device by absorbing vibrations. However, the vibration absorbing ability of such visco-elastic cylinders degrades over time. In addition, such traditional vibration isolators may introduce undesirable compliance into an interface between the vibrating device and its structural support base. Furthermore, traditional vibration isolators may not be acceptable for use in aerospace applications, among others, due to the weight and complexity associated with such systems.

SUMMARY OF THE INVENTION

Accordingly, it is an object of the present invention to provide an apparatus and method for damping vibrations emanating from a device mounted on a base or support structure.

It is another object of the present invention to provide a lightweight and reusable apparatus for detuning from resonance a support member having a device from which vibratory energy emanates interconnected thereto.

It is yet another object of the present invention to provide an apparatus for detuning from resonance a support member which does not warp, twist or otherwise alter the shape or configuration of the support member to accomplish such detuning.

It is a further object of the present invention to provide a modular apparatus for detuning from resonance a structure.

It is yet another object of the present invention to provide an apparatus for detuning from resonance a support structure, the apparatus offering dielectric protection, wire collimation and wire tendon registration within the support structure.

It is still another object of the present invention to provide an apparatus for detuning from resonance a structure having equipment mounted thereon which may be adversely effected by vibratory energy emanating from a vibrating device positioned proximate the structure.

The above objects are accomplished by providing a substrate actuator having at least a first wire embedded within a substrate matrix material. In one aspect of the present invention, for purposes of detuning from resonance a support structure upon which a device from which vibrations emanate is interconnected, at least one of the substrate actuators of the present invention is couplable to the support structure, and is operatively associated with a means for heating at least the first wire. In another aspect of the present invention, at least one of the substrate actuators of the present invention is couplable to a structure to which components adversely effectable by vibratory energy are interconnected to detune from resonance such structure.

In one embodiment, heating of at least the first wire within the substrate actuator of the present invention from a first temperature to a second temperature increases the modulus of elasticity of at least the first wire embedded within the substrate matrix material from a first modulus of elasticity to a second modulus of elasticity, which in turn increases the stiffness of the substrate actuator. Such an increase in stiffness during operation of the vibrating device inhibits propagation of vibratory energy of specific frequencies from the vibrating device into the support structure and surrounding structures by detuning from resonance the support structure.

To facilitate rapid installation and/or removal of the substrate actuators of the present invention into and from various support structures, and to facilitate access thereto, the substrate actuators of the present invention may be modular in nature. In this regard, a substrate actuator having features of the present invention may be embeddable in, on or otherwise couplable to a structure, as opposed to embedding wires directly into the support structure. As such, the substrate actuator of the present invention offers dielectric protection, wire or foil collimation and wire registration within the support structure. Such modularity also provides for efficient installation and/or removal of the substrate actuators from such support structures.

In one embodiment, at least one substrate actuator of the present invention is sized and/or configured to substantially fit within a recessed or hogged-out portion in a surface of the structure upon which the vibrating device is interconnectable and/or a structure effected by the vibratory energy emanating from a vibrating device. In another embodiment, at least one substrate actuator of the present invention is embeddable within at least one cavity formed within the structure to be detuned from resonance. Substrate actuators of the present invention may also be positioned on one or more surfaces of such support structures. In yet another embodiment, at least one substrate actuator is interconnectable to the support structure such that at least a portion of the substrate actuator is interposed between the device from which vibratory energy emanates and the support structure.

For purposes of significantly increasing the stiffness of the substrate actuator when desired, the substrate matrix material may be selected. Generally, at an elevated temperature, the modulus of elasticity of at least the first wire should be greater than or equal to the modulus of elasticity of the substrate matrix material, and, at lower temperatures, the modulus of elasticity of at least the first wire is comparable or can be lower than the modulus of elasticity of the substrate matrix material. In one embodiment, the matrix material comprises a nonconductive material having a relatively low modulus of elasticity, such as glass epoxy, or materials with relatively higher elastic modulii, such as glass polycynate or glass polyimide. The structure on or within which the substrate actuators of the present invention are couplable may comprise a composite material or a metal, such as aluminum, which has a relatively low modulus of elasticity.

In one embodiment, for purposes of achieving a significant increase in the modulus of elasticity of at least the first wire, relative to the substrate matrix material, at least the first wire is fabricated from a shape memory alloy (e.g., nickel titanium, nickel titanium copper, nickel titanium palladium and nickel titanium hafnium). In instances where at least the first wire comprises a shape memory alloy, the increase in modulus of elasticity and therefor, the increase in stiffness of the substrate actuator, is reversible, as repeated heating and cooling of at least the first wire produces a reversible crystalline phase transformation within the first wire. As such, increasing the temperature of a first wire comprising a shape memory alloy does not substantially alter the shape or configuration of the first wire, but only results in an increase in the modulus of elasticity of the first wire. In this regard, the shape or configuration of the substrate matrix material is not substantially altered, and detuning of the support structure from resonance is accomplished without twisting of the substrate actuator or structure coupled thereto.

A plurality of shape memory alloy wires may be embedded in substrate matrix material to form a substrate actuator interconnectable to a support structure to detune from resonance the support structure. Detuning from resonance of the support structure is enhanced due to the combinative effect of the plurality of wires embedded within the substrate matrix material. Specifically, for a device having a given mass, the number of shape memory alloy wires utilized in the substrate actuator is selectable, depending upon the amount of modulus shift desired in the substrate actuator. In this regard, the degree to which the modulus of elasticity of the substrate actuator should increase to affect a frequency shift is dependent upon the number of wires embedded in the substrate matrix material, as well as the amount of heat applied to the wires within the phase transformation temperature range.

At least the first wire may be uniformly distributed throughout the substrate matrix material to uniformly increase the stiffness of the substrate matrix material throughout the substrate (i.e., to avoid radiated stiffness across the substrate). In one embodiment, at least the first wire is distributed within the matrix material in one of a serpentine, circular and criss-cross pattern. Further, in instances where portions or segments of at least the first wire are positioned substantially adjacent one another, such portions are spaced apart a distance of at least one diameter of the first wire, with matrix material extending therebetween. In another embodiment, for purposes of sufficiently increasing the stiffness of the substrate actuator throughout the actuator, such portions of at least the first wire are spaced apart a distance of no more than ten diameters of the first wire. In addition, at least the first wire may be embedded within the matrix material such that at least the first wire is encapsulated within the matrix material. In this regard, the apparatus of the present invention offers dielectric protection.

Heating of at least the first wire may be accomplished by convective and/or conductive heating means and/or by resistance heating means. In one embodiment, the heating means is in fluid connection with at least the substrate matrix material and comprises a means for passing a fluid (e.g., air) at an elevated temperature over the substrate actuator (e.g., for oven-type heating). Such convective heating increases the temperature of the substrate matrix material, which in turn increases the temperature of at least the first wire embedded therein. This increase in the temperature of at least the first wire increases the modulus of elasticity in at least the first wire, which results in an increase in the stiffness of the actuator. In another embodiment, the heating means is in electrical connection with at least the first wire and comprises a means for direct, resistance heating of at least the first wire. In this embodiment, at least the first wire may be electrically connected to a source for supplying an electric current. In this regard, the temperature of at least the first wire may be increased by resistance heating, which in turn, increases the modulus of elasticity of the first wire to thereby increase the stiffness of the actuator to thereby detune from resonance the support structure receiving vibratory energy.

In another aspect, the present invention is directed to a method for detuning a structure effected by vibratory energy. In one embodiment, the method concerns detuning from resonance a structure upon which a vibrating device is interconnected. In another embodiment, the method concerns detuning from resonance a structure supporting components which are adversely effectable by vibratory energy. The method generally includes the steps of coupling with the structure at least a first modular substrate actuator having at least a first wire embedded within a substrate matrix material and heating at least the first wire to increase the stiffness of the substrate actuator. In instances where at least the first wire is a shape memory alloy, such heating of the first wire increases the modulus of elasticity of the first wire, which increases the stiffness of the modular substrate actuator to detune from resonance the structure coupled therewith.

In one embodiment, the step of heating at least the first wire includes applying electrical current to at least the first wire to resistively heat at least the first wire. Alternatively, or in conjunction with the above-described applying step, the step of heating includes flowing a fluid at a temperature greater than the temperature of at least the first wire over the substrate actuator to heat at least the first wire to thereby increase the modulus of elasticity of at least the first wire. Such flowing of a fluid over the substrate actuator provides for convective and/or conductive heat transfer from the fluid to at least the first wire via the substrate matrix material.

In one embodiment, the method further includes the steps of uniformly distributing at least the first wire within the matrix material in a selected pattern in order to provide for a uniform increase in stiffness across the substrate actuator when the first wire is heated. The uniformly distributing step may include configuring at least the first wire in the selected pattern within a mold cavity, filling the mold cavity with a matrix material (e.g., chipped fiber and resin mixture) and curing the matrix material to form the modular substrate actuator.

In one embodiment, the step of coupling the first substrate actuator to the structure includes the step of interconnecting the substrate actuator to the structure by chemically bonding or mechanically fastening the substrate actuator to the structure. For purposes of enhancing coupling between the substrate actuator and the support structure to thereby enhance detuning from resonance the support structure, a plurality of substrate actuators may be interconnected to or embedded within one or more surfaces of the support structure. In another embodiment, for purposes of enhancing coupling between the substrate actuator and the support structure to thereby enhance detuning of the support structure, the step of interconnecting the first substrate actuator includes the steps of forming at least a first recessed area or cavity within the support structure and bonding the substrate actuator within the first recessed area or cavity via a chemical bond or mechanical fastener, the substrate actuator and first recessed area or cavity being of substantially corresponding volumes.

DETAILED DESCRIPTION OF THE INVENTION

Figure 1:
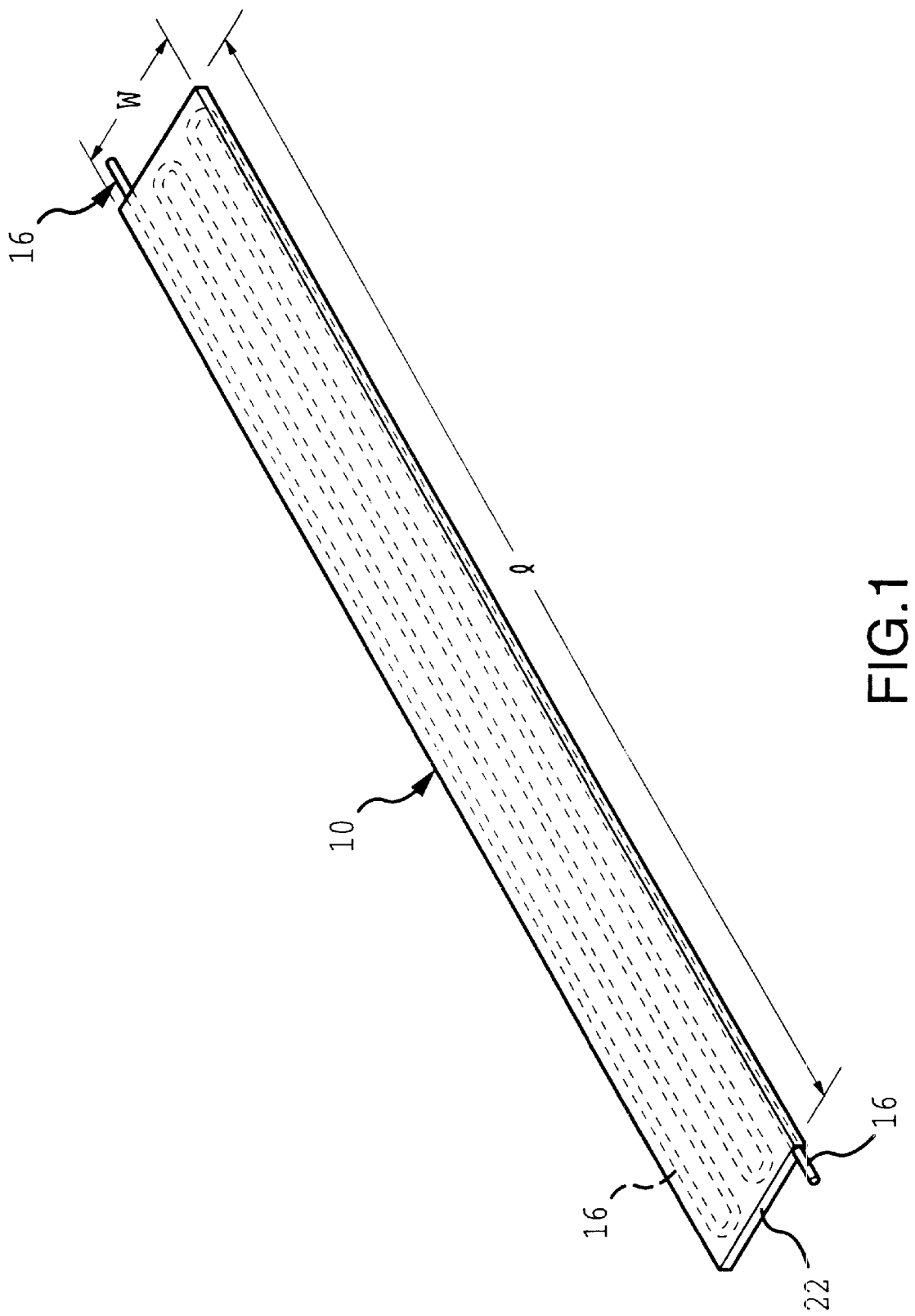
FIG. 1 is a perspective view of one embodiment of the actuator system of the present invention.

FIGS. 1–7 illustrate a substrate actuator embodying the various features of the present invention. Generally, for purposes of detuning from resonance a support structure having a vibrating device interconnected thereto, or otherwise having equipment mounted thereon which is effected by a vibrating device, the modular actuator 10 includes at least a first wire 16, shown in FIG. 2, embeddable within a substrate matrix material 22. Of importance, at least the first wire 16 is operatively associated with a means for heating at least the first wire 16. In this regard, heating of at least the first wire 16 from a first temperature to a second temperature increases the modulus of elasticity of the first wire 16 from a first modulus of elasticity to a second modulus of elasticity, which, in turn, increases the stiffness of the substrate actuator. As such, the substrate actuator 10 detunes from resonance the support structure 36 upon which the vibrating device 42 is mounted and thus inhibits transmission of vibratory energy of specific frequencies from the vibrating device into the support structure and into surrounding structures.

Figure 4:
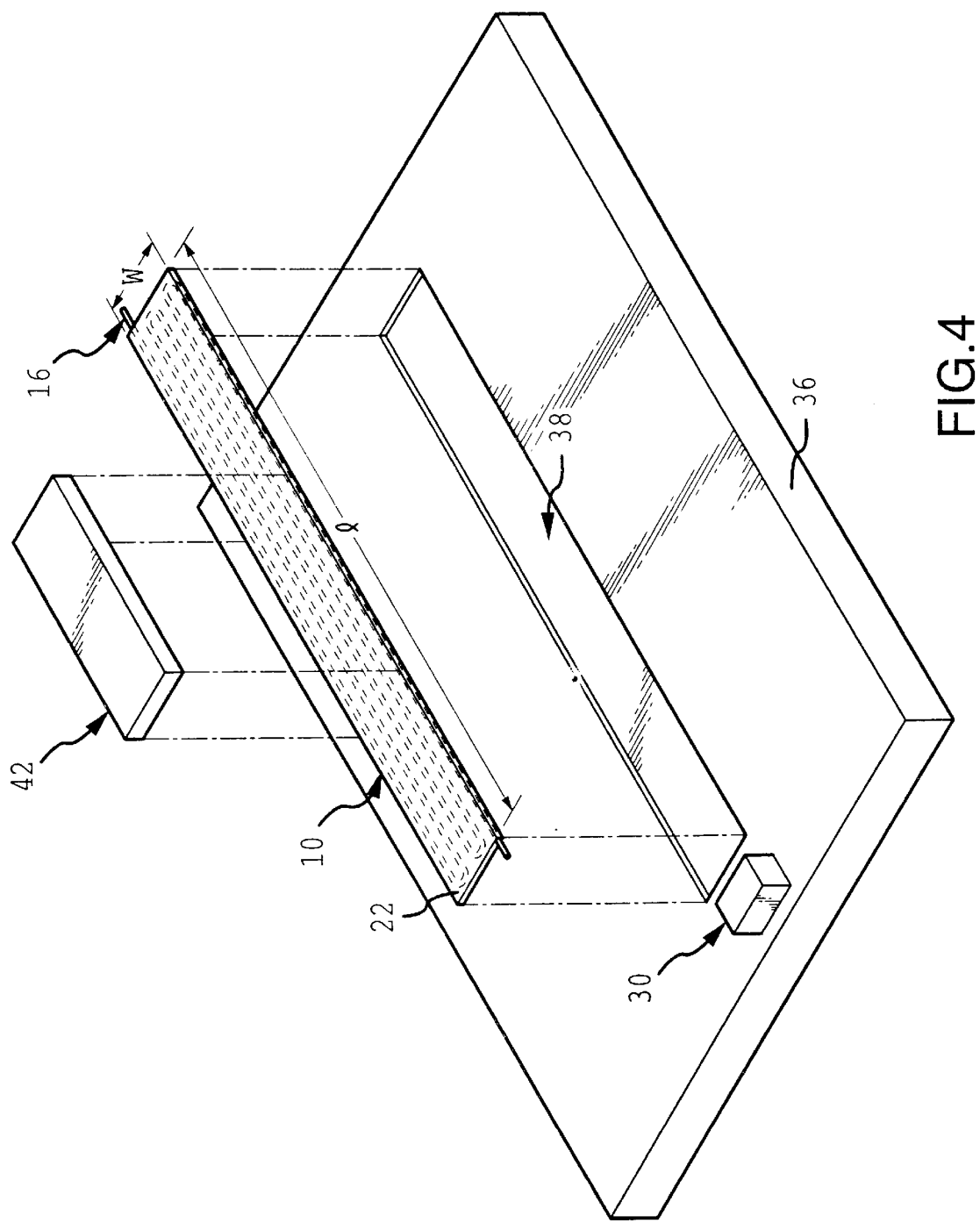
FIG. 4 is an exploded view of the actuator illustrated in FIG. 1 embeddable in a support structure.
Figure 5:
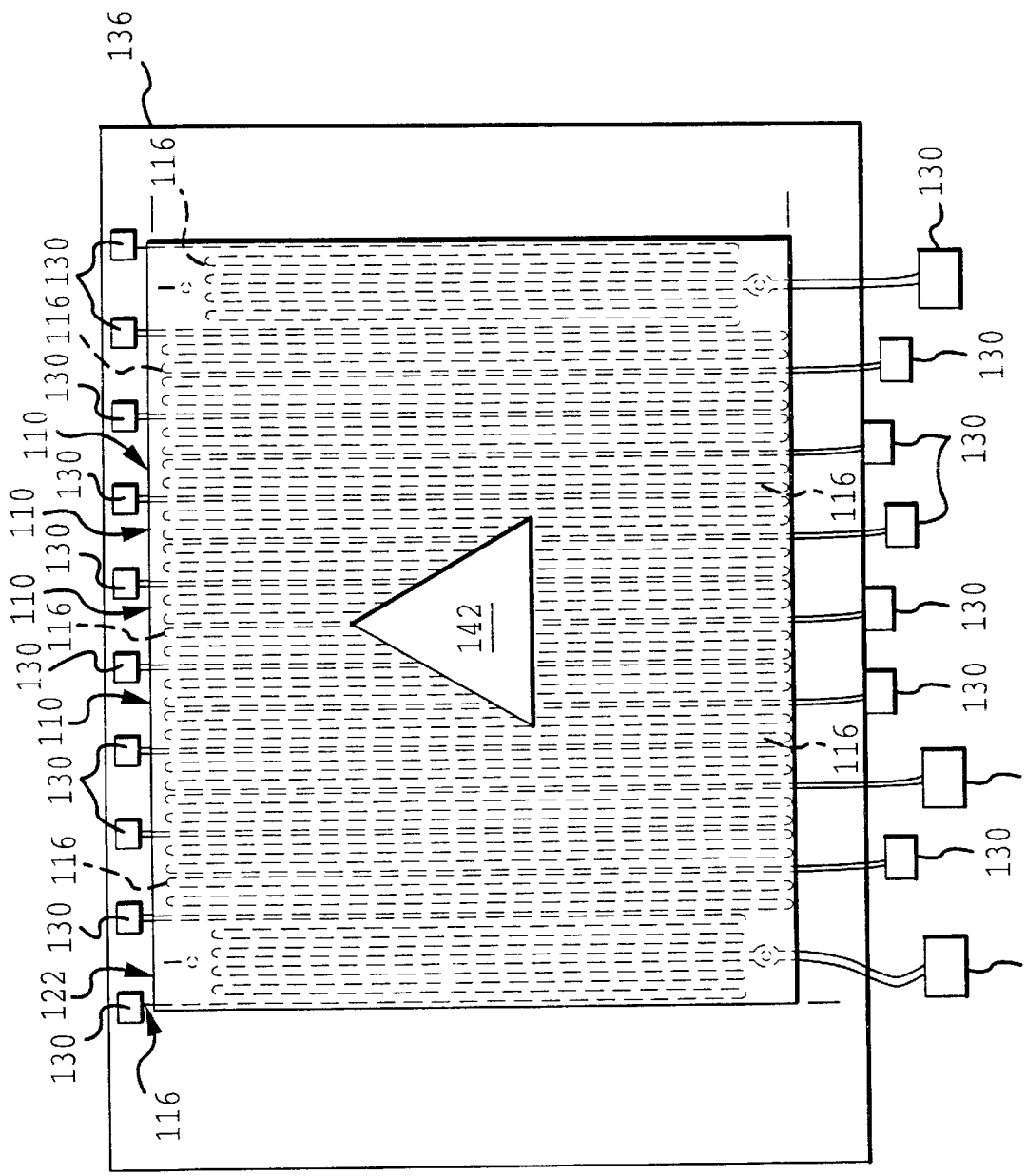
FIG. 5 is a top view of another embodiment of the actuator of the present invention.

As illustrated in FIGS. 1 and 4, the actuator 10 is modular in nature, which facilitates the rapid installation and/or removal of the actuator 10 into and/or from support structures 36 interconnected to vibrating devices 42. In one embodiment, the support structure 36 upon which the vibrating device 42 (e.g., compressor, motor, electronic and optical component packages) is mounted, is "hogged out" and/or otherwise configured to receive the modular substrate actuator 10 therein. In this regard, the modular substrate actuator 10 may be sized to be embeddable within a first hogged-out portion 38 of the support structure 36. Further, in order to provide enhanced coupling between the modular actuator 10 and the support structure 36, the modular actuator 10 may be chemically bonded to the support structure, within the hogged-out portion 38, via an adhesive, such as a two part epoxy or paste. In an alternative embodiment, the modular actuator 10 may be interconnected to the support structure 36 via mechanical fastening devices. Such coupling of the modular actuator 10 to the support structure 36 enhances the detuning capabilities of the modular actuator 10 as increases in stiffness in the modular actuator 10 are transmittable into the support structure 36.

Referring to FIGS. 1–5, for purposes of significantly increasing the stiffness of a modular actuator when a vibrating device is operating, the first wire 16 of the modular actuator 10 exhibits increased modulus of elasticity with increases in temperature of the first wire 16. More specifically, the first wire 16 of the present invention has a first modulus of elasticity at a first temperature and a second modulus of elasticity greater than the first modulus of elasticity at a second temperature greater than the first temperature. In this regard, when heated from a first temperature to a second temperature, the first wire 16 exhibits an increase of modulus of elasticity, which, in turn, provides for a stiffer first wire 16. In one embodiment, for purposes of achieving a significant increase in the modulus of elasticity of the first wire, the first wire is fabricated from a shape memory alloy selected from the group consisting of nickel titanium, nickel titanium copper, nickel titanium palladium and nickel titanium hafnium. In this regard, increases in stiffness of the first wire 16 are reversible as heating of the first wire 16 produces a reversible crystalline phase transformation within the first wire 16. When heat-actuated, the modulus of elasticity of the first wire 16 fabricated from a shape memory alloy increases by a factor from about three to about seven times the original modulus of elasticity, as a function of wire conditioning and training, without substantially altering the shape or configuration of the first wire.

As illustrated in FIGS. 1 and 4, at least the first wire 16 is embeddable into the substrate matrix material 22, which provides dielectric protection. Generally, for purposes of significantly increasing the stiffness of the modular actuator 10, the modulus of elasticity of the first wire 16 at an elevated temperature should be greater than or equal to the modulus of elasticity of the substrate matrix material 22, and, at lower temperatures, the modulus of elasticity of the first wire 16 should be comparable or lower than the modulus elasticity of the substrate matrix material 22. In this regard, the substrate matrix material 22 comprises a composite material having a modulus of elasticity of less than about 3 million pounds per square inch (msi) to about 7 msi. In one embodiment, the substrate matrix material which encapsulates at least the first wire 16 comprises a glass epoxy. The substrate matrix material 22 may be fabricated from a nonconductive material, as electric current may flow through wires 16 to heat the wires 16. In other embodiments, the substrate matrix material comprises glass polycynate or glass polyimide.

Figure 2:
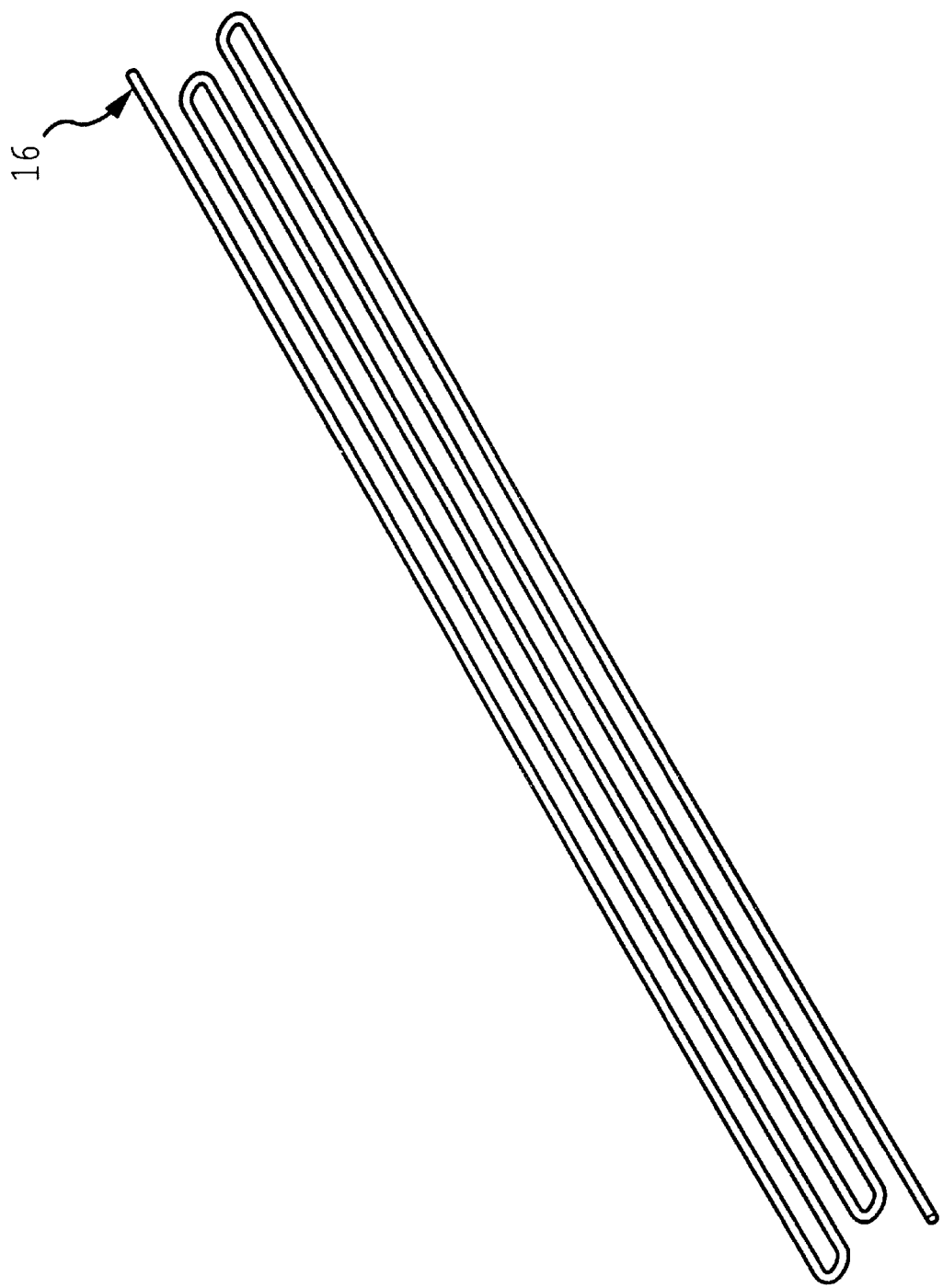
FIG. 2 is a perspective view of a first wire in a serpentine configuration.
Figure 3A:
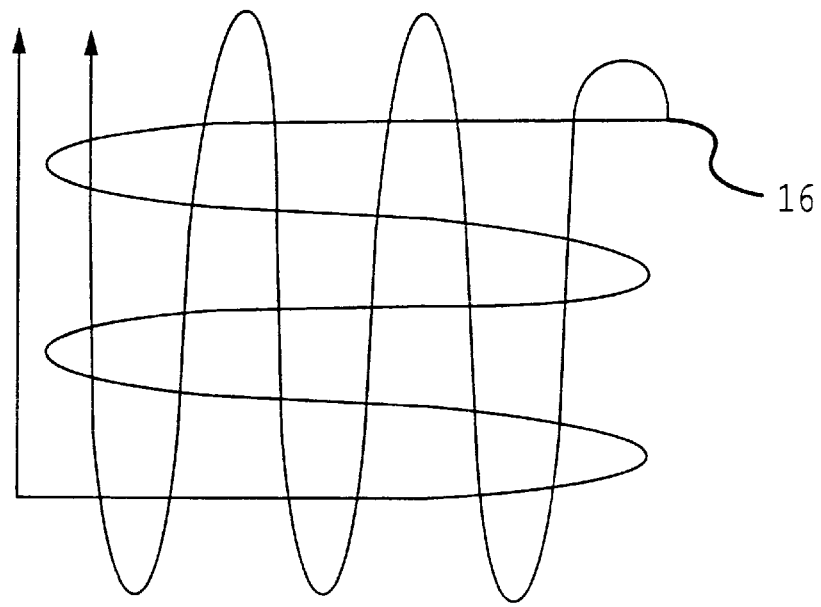
FIGS. 3A–3B are alternative configurations of the first wire.
Figure 3B:
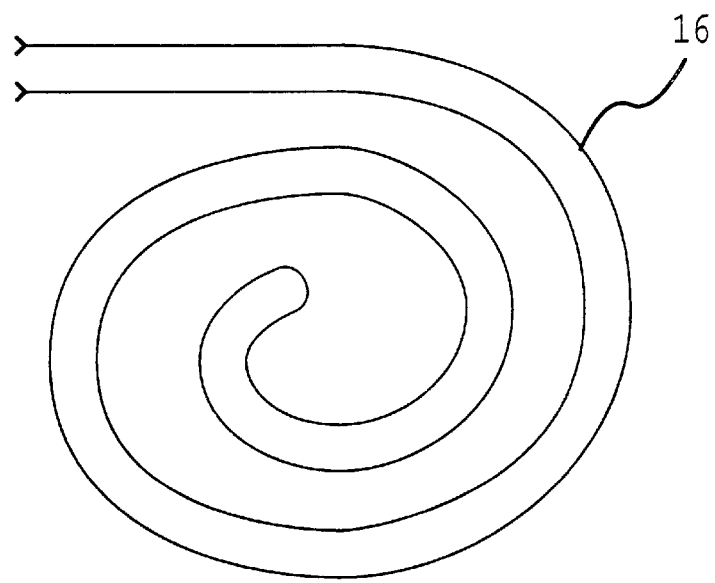

FIGS. 2 and 3A–3B illustrate a few of the configurations in which at least the first wire 16 may be embedded within the substrate matrix material 22. Generally, at least the first wire 16 is uniformly distributed throughout the substrate matrix material 22 to uniformly increase the stiffness throughout the substrate actuator 10 when at least the first wire 16 is heated. In one embodiment, illustrated in FIGS. 1 and 2, at least the first wire 16 is distributed within the substrate matrix material 22 in a serpentine configuration. Alternatively, and as illustrated in FIGS. 3A–3B, at least the first wire 16 may be configured in a circular or criss-cross pattern. These configurations of at least the first wire 16 within the substrate matrix material 22 provide wire or foil collimation.

The shape memory alloy wire packing density and wire orientation within the substrate material is dependent upon the mode shapes of the target frequencies to be shifted. The greatest effect will be when the mode shape deforms the structure in such a way as to stretch and compress the shape memory alloy wires. If the structure with the shape memory alloy is a beam that is being stretched axially and in the direction of the wires, the stiffness is determined as follows:

$$\text{Stiffness} = \text{Area}_{SMA} * \text{Modulus}_{SMA} * \text{Area}_{core} * \text{Modulus}_{core} + \Sigma \text{Area}_{plies} * \text{Modulus}_{ply}$$

If the beam is being deformed in bending, the stiffness is determined by:

$$\text{Stiffness} = \text{Inertia}_{SMA}*\text{Modulus}_{SMA}*\text{Inertia}_{core}*\text{Modulus}_{core} + \Sigma\text{Inertia}_{plies}*\text{Modulus}_{ply},$$

where the inertia calculations are about the neutral axis of the structure.

The change in the frequency of the beam is proportional to $\sqrt{\text{Stiffness}_{actuated}/\text{Stiffness}_{unactuated}}$ In most structures, the beam analogy may be too simplistic to be useful. The analysis to determine volume fraction and placement of the shape memory alloy wires is usually addressed using a Finite Element Model. The types of elements used in the analysis will depend on the fidelity of the desired answer. If shell elements are used, the material properties are best generated from a laminate or composite stackup. The ply properties that contain the shape memory alloy wires can be created using any of the standard micromechanics theories such as "Composite Cylinder Assemblage" or "Halpin-Tsai" to name just a few. Laminate properties such as stiffness need to be calculated for both the actuated and the un-actuated temperatures states.

The overall change in stiffness of the structure is dependent upon the product of the magnitude of change in the modulus of the shape memory alloy and the volume fraction of shape memory alloy material relative to the stiffness of the matrix material. Matrix materials with a high modulus will require higher volume fractions of shape memory alloy material to experience similar changes in stiffness if a low modulus matrix material were employed. Typically, the volume fraction of shape memory alloy is increased by increasing the packing density of the substrate actuators of the present invention.

In one embodiment, for purposes of adequately increasing stiffness of the substrate actuator throughout the actuator, adjacent segments or portions of at least the first wire 16 should be spaced no more than 10 diameters of the first wire 16 apart. In another embodiment, adjacent segments or portions of at least the first wire 16 should be positioned no closer than one diameter of the first wire 16 apart, with the matrix material 22 extending between such portions of the first wire 16. Otherwise, the changes in the modulus of elasticity of the first wire 16, and resulting increases in stiffness of the substrate actuator are insignificant. And, if such portions of the first wire 16 contact one another, resistance becomes an issue. In a preferred embodiment, for substrate matrix materials comprising one of a glass epoxy, glass polycynate and glass polyimide, adjacent portions of the first wire 16 are between one diameter of the first wire 16 and six diameters of the first wire 16 apart (e.g., where the first wire 16 has a diameter of 0.020 inches, 0.60 inches, 0.80 inches, etc.).

The heating means is generally used to increase the modulus of elasticity of at least the first wire 16, which results in an increase in stiffness of the substrate actuator 10 to thereby detune from resonance the support structure 36 upon which the vibrating device 42 is interconnected. More specifically, for purposes of increasing the modulus of elasticity of at least the first wire 16, the heating means is capable of convectively and/or conductively heating at least the first wire or, alternatively, resistance heating the first wire 16. In one embodiment, the heating means is in fluid connection with the substrate matrix material 22. In this regard, the heating means comprises a means for passing a fluid (e.g., a gas, such as air, or a liquid) at an elevated temperature (e.g., greater than that of the first wire 16) over the modular actuator 10 and specifically, over the substrate matrix material 22. Such oven-type heating increases the temperature of the substrate matrix material which, in turn, increases the temperature of the first wire 16 embedded therein. In one embodiment, heat from the vibrating device 42 itself or from any nearby device (not shown) may be used to increase the temperature of the first wire 16 of the modular actuator 10. In another embodiment, the first wire 16 has wire ingress and egress points which are connectable to a heating means comprising an electric source. In this regard, the first wire 16 is resistance heated by applying a current through the first wire 16 via the wire ingress and egress points of the first wire 16.

In one embodiment, where the first wire 16 comprises a shape memory alloy having a diameter of about 0.020 inches, power of about 12 watts may be applied to the first wire 16 to increase the temperature thereof between about 20° C. and about 80° C., which may result in an increase in the elastic modulus of the shape memory alloy first wire 16 by a factor from about three to about seven times the original elastic modulus. Such an increase in the elastic modulus of the shape memory alloy first wire results in an increase in the stiffness of the substrate actuator. For example, in one embodiment, the increase in stiffness of the substrate actuator is between about 2:1 and about 7:1.

As indicated herein above, a modular substrate actuator of the present invention may be used to detune from resonance a support structure which is interconnected to and supports a vibrating device. In order to detune from resonance such a structure, the modular substrate actuators of the present invention may be coupled to the support structure, such that the modular actuators are located about the vibrating device, and/or interposed between the vibrating device and the support structure. In one embodiment, illustrated in FIG. 5, at least a first modular actuator 110 is interconnectable to (e.g., mechanically fastened) the support structure 136 and has a sufficient cross-sectional area to detune the vibrating energy from the vibrating device 142 interconnected thereto. For purposes of providing an area of uniform increases in stiffness, a plurality of modular actuators 110 each having at least a first wire 116 embedded within substrate matrix material 122 may be interconnected to the vibrating device 142 and the support structure 136. A heating means 130 for resistance heating of the first wire 116 is in electrical connections with at least the first wire 116.

Figure 6:
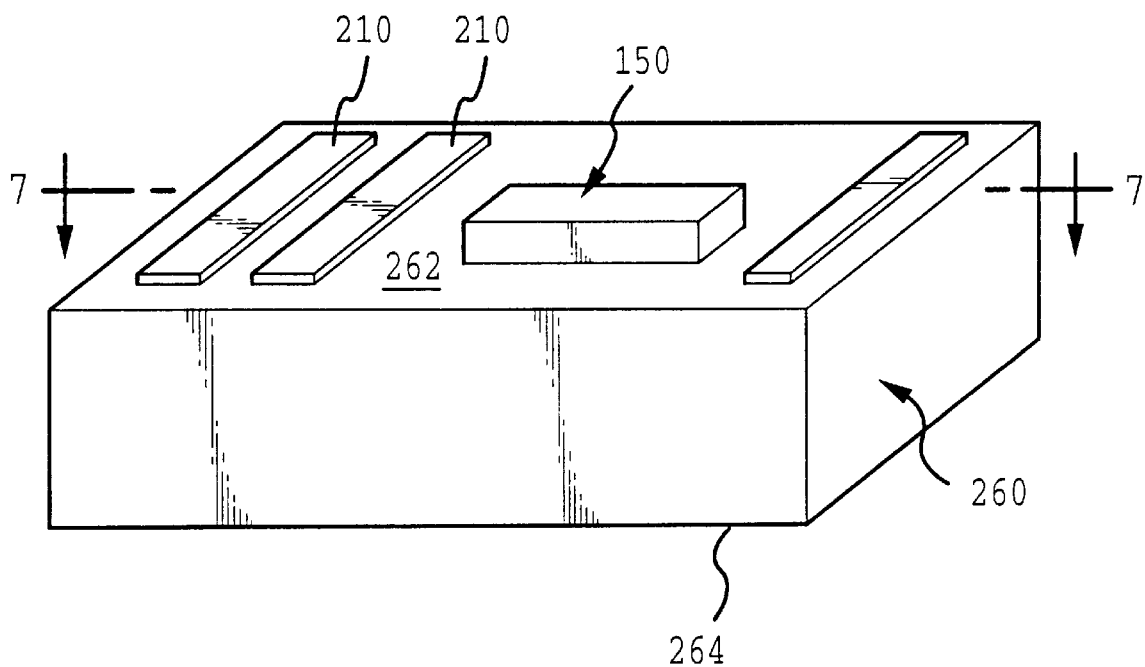
FIG. 6 is a perspective view of another embodiment of the substrate actuators of the present invention coupled with a support structure.
Figure 7:
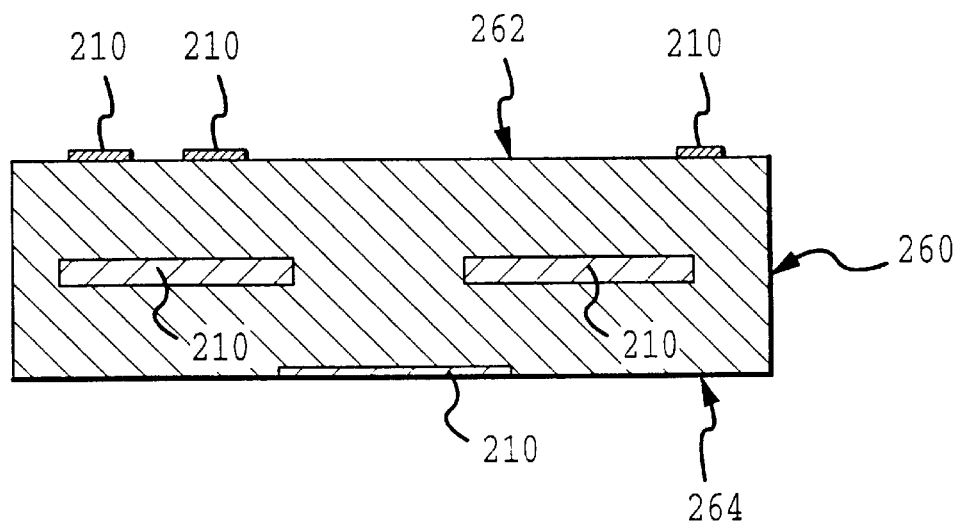
FIG. 7 is a cross-sectional view of the substrate actuators and support structure illustrated in FIG. 6.

Referring to FIGS. 6 and 7, in another embodiment, for purposes of detuning from resonance a support structure 260, a plurality of substrate actuators 210 of the present invention are couplable to one or more surfaces (e.g., top and/or bottom surfaces 262, 264) of the support structure 260 and are embeddable within the support structure 260. Components 150 (e.g., electronic, optical packages sensitive to vibratory energy) mounted to the top surface 262 of the support structure 260 may thus be protected from vibratory energy as the substrate actuators 210 of the present invention can detune from resonance the support structure 260 when actuated by the heating means described hereinabove.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. The embodiments described hereinabove are further intended to explain best modes known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

What is claimed is:

1. A vibrational system, comprising:
   a first structural member;
   a vibrating device interconnected with said first structural member;
   a substrate actuator interconnected with said first structural member, said substrate actuator comprising at least a first wire embedded within a matrix material, wherein at least said first wire is fabricated from a shape memory alloy;
   a means, operatively interfaceable with said substrate actuator, for heating at least said first wire to reversibly increase the modulus of elasticity of at least said first wire from a first modulus of elasticity to a second modulus of elasticity greater than said first modulus of elasticity to thereby increase the stiffness of said substrate actuator from a first stiffness to a second stiffness greater than said first stiffness; and
   means for producing a frequency shift in vibratory energy transmitted from said vibrating device to said first structural member, said means for producing comprising said substrate actuator and said means for heating.

2. A system, as claimed in claim 1, wherein said substrate actuator has a first shape, wherein said first shape of said substrate actuator is maintainable as at least said first wire is heated.

3. A system, as claimed in claim 1, wherein at least said first wire has a first configuration, wherein said first configuration of at least said first wire is maintainable as at least said first wire is heated.

4. A system, as claimed in claim 1, wherein at least said first wire is uniformly distributed within said matrix material in one of a serpentine, circular and criss-cross pattern.

5. A system, as claimed in claim 1, wherein at least said first wire has a first diameter, wherein at least first and second segments of at least said first wire are positionable adjacent one another, spaced apart a distance of at least said first diameter, said matrix material extending between said first and second segments of at least said first wire.

6. A system, as claimed in claim 1, wherein said means for heating at least said first wire comprises one of an electric source operatively connected to at least said first wire for resistance heating of at least said first wire and an ambient air heating source in fluid connection with said substrate actuator for heating at least said first wire via said matrix material.

7. A system, as claimed in claim 1, wherein said substrate actuator is removably embeddable in at least a portion of the first structural member to couple said substrate actuator with the first structural member.

8. A system, as claimed in claim 1, wherein said substrate actuator is interconnectable to at least a portion of the first structural member to couple said substrate actuator with the first structural member via one of fasteners and adhesives.

9. A system, as claimed in claim 1, further comprising a plurality of said substrate actuators interconnected with said first structural member.

10. A system, as claimed in claim 1, wherein said at least a first wire is a continuous member, and wherein adjacent portions of said first wire are spaced from each other by distance of at least one diameter associated with said first wire.

11. A system, as claimed in claim 1, wherein said substrate actuator comprises a plurality of said first wires, wherein each said first wire is spaced from each adjacent said first wire by distance of at least one diameter associated with each said first wire.

12. A system, as claimed in claim 1, wherein said first modulus of elasticity of said first wire at said first temperature is no greater than a modulus of elasticity of said matrix material at the same said first temperature.

13. An apparatus for detuning from resonance a structure receiving vibratory energy from a vibrating device, said apparatus being couplable to the structure, said apparatus comprising:
    a matrix material; and
    at least a first wire embedded and uniformly distributed throughout said matrix material for increasing the stiffness of said apparatus when the temperature of at least said first wire increases from a first temperature to a second temperature, wherein at least said first wire is fabricated from a shape memory alloy and has a first modulus of elasticity at said first temperature and a second modulus of elasticity greater than said first modulus of elasticity at said second temperature, and wherein said second modulus of elasticity of said first wire at said second temperature is at least as great as a modulus of elasticity of said matrix material at the same said second temperature.

14. An apparatus, as claimed in claim 13, wherein said matrix material defines a first shape, wherein said first shape is maintainable as the temperature of at least said first wire increases from said first temperature to said second temperature.

15. An apparatus, as claimed in claim 13, wherein at least said first wire defines a first wire configuration, wherein at least said first wire configuration is maintainable as the temperature of at least said first wire increases from said first temperature to said second temperature.

16. An apparatus, as claimed in claim 13, wherein said matrix material comprises a composite having a modulus of elasticity of less than about 3–7 msi.

17. An apparatus, as claimed in claim 13, wherein said matrix material comprises a nonconductive material selected from the group consisting of glass epoxy, glass polycynate and glass polyimide.

18. An apparatus, as claimed in claim 13, wherein said apparatus has a first stiffness when said first wire is at said first temperature and a second stiffness when said first wire is at said second temperature, wherein a first ratio of said second stiffness of said apparatus to said first stiffness of said apparatus is between about 2:1 and about 7:1.

19. An apparatus, as claimed in claim 13, wherein said matrix material is in fluid connection with a heat source for convectively heating said matrix material to thereby conductively increase the temperature of said first wire.

20. An apparatus, as claimed in claim 13, wherein said first wire is operatively connected to an electrical source for selective resistance heating of said first wire.

21. An apparatus, as claimed in claim 13, wherein increasing the temperature of said first wire from said first temperature to said second temperature produces a reversible crystalline phase transformation in said first wire.

22. An apparatus, as claimed in claim 13, wherein said apparatus is removably interconnectable to the structure.

23. A method for detuning a support structure from resonance frequency, said structure being subject to vibratory energy from a vibrating device said method comprising the steps of:
    coupling with the support structure at least a first modular substrate actuator, the first modular substrate actuator having a matrix material and at least a first wire embedded within the matrix material, the first wire including a shape memory alloy;

operating said vibrating device to generate vibratory energy;

transferring said vibratory energy into said structure;

heating at least the first wire embedded within the matrix material to increase the stiffness of the first modular substrate actuator; and terminating said transferring step based upon said heating step by affecting a frequency shift in said vibratory energy.

24. A method, as claimed in claim 23, wherein said heating step comprises the step of applying an electric current to at least the first wire to resistively heat at least the first wire.

25. A method, as claimed in claim 23, wherein said heating step comprises the step of exposing at least the first modular substrate actuator to a fluid flow to increase the temperature of at least the first wire embedded within the substrate matrix material, the fluid of the fluid flow having a temperature greater than the temperature of at least the first wire.

26. A method, as claimed in claim 23, wherein said coupling step comprises the step of:

one of bonding and fastening the first modular substrate actuator to the support structure.

27. A method, as claimed in claim 23, wherein said coupling step comprises the step of:

embedding at least the first modular substrate actuator into the support structure.

28. A method, as claimed in claim 27, wherein said embedding step includes the steps of:

providing at least a first recessed area in the support structure, wherein the first recessed area substantially corresponds to the volume of the first modular substrate actuator; and bonding the first modular substrate actuator to the support structure within the first recessed area.

29. A method, as claimed in claim 23, further comprising, before said coupling step, the step of uniformly distributing the first wire into the matrix material in one of a serpentine, circular and criss-cross pattern to provide for uniform increases in stiffness of the first modular substrate actuator.

30. A method, as claimed in claim 29, wherein said uniformly distributing step comprises the steps of:

configuring the first wire in one of the serpentine, circular and criss-cross patterns within a mold cavity;

filling the mold cavity with the matrix material; and curing the matrix material to form the first modular substrate actuator.

31. A method, as claimed in claim 23, further comprising step of:

producing a first effect on said first modular substrate actuator from said heating step, said first effect consisting essentially of increasing a stiffness of said first modular substrate actuator.

* * * * *

UNITED STATES PATENT AND TRADEMARK OFFICE
CERTIFICATE OF CORRECTION

PATENT NO. : 6,024,347
DATED : February 15, 2000
INVENTOR(S) : Grosskrueger et al.

It is certified that error appears in the above-identified patent and that said Letters Patent is hereby corrected as shown below:

<u>Title page,</u>
Item [73], delete the word "Lockhead" and insert therefor -- Lockheed --.

Signed and Sealed this

Ninth Day of April, 2002

Attest:

*Attesting Officer*

JAMES E. ROGAN
*Director of the United States Patent and Trademark Office*